United States Patent [19]

Belkin

[11] 3,892,204
[45] July 1, 1975

[54] ADJUSTABLE SUPPORT

[76] Inventor: Paul V. Belkin, 5320 North Highway 140, Florissant, Mo. 63033

[22] Filed: May 11, 1973

[21] Appl. No.: 359,619

[52] U.S. Cl. ............................................. 119/103
[51] Int. Cl. ............................................. A61d 3/00
[58] Field of Search .................... 17/44.2, 44, 44.1; 119/103; 248/124, 125, 362; 269/328

[56] References Cited
UNITED STATES PATENTS

| | | | |
|---|---|---|---|
| 988,923 | 4/1911 | Bauerfeind | 269/328 |
| 1,516,795 | 11/1924 | Schwarting | 269/328 |
| 3,298,648 | 1/1967 | Sepanski | 248/125 |
| 3,524,434 | 8/1970 | Finley | 119/103 |

*Primary Examiner*—Louis G. Mancene
*Assistant Examiner*—James D. Hamilton
*Attorney, Agent, or Firm*—Rogers, Ezell & Eilers

[57] ABSTRACT

An adjustable support, which can be used to support and hold an animal on its back, includes a base that is releasably securable to a table on which the animal is to be supported, an upright which extends vertically upwardly from that base, a padded plate-like supporting member which provides lateral support for one side of the animal's body, a connector which is releasably securable to that upright at various points along the length of that upright, and a bar which is secured to that upright by that connector but which can be shifted laterally relative to that upright. The padded plate-like supporting member can be set at various points along the length of that upright, and thus can be set at a level which will enable it to provide lateral support for any desired portion, between the neck and the abdomen, of the animal's body. The bar can be shifted endwise to accommodate animals having different body widths; and the front legs of the animals can be taped or otherwise secured to the front or rear face of that bar.

19 Claims, 6 Drawing Figures

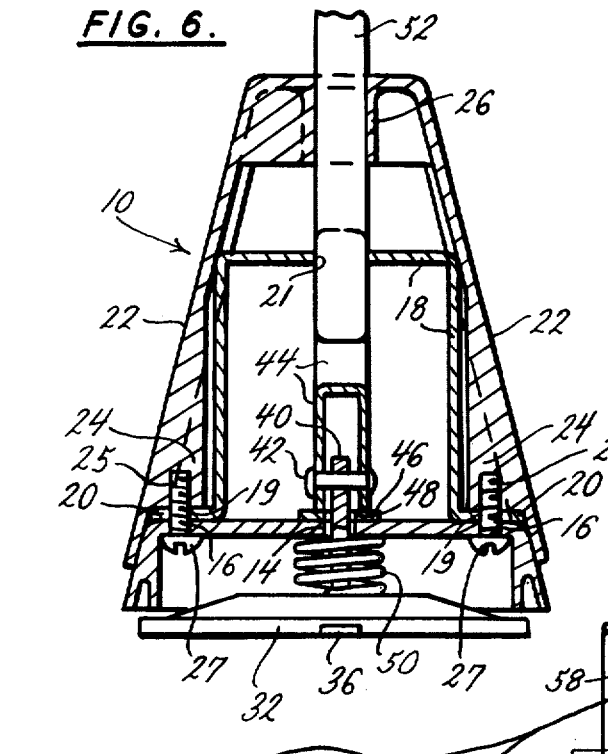
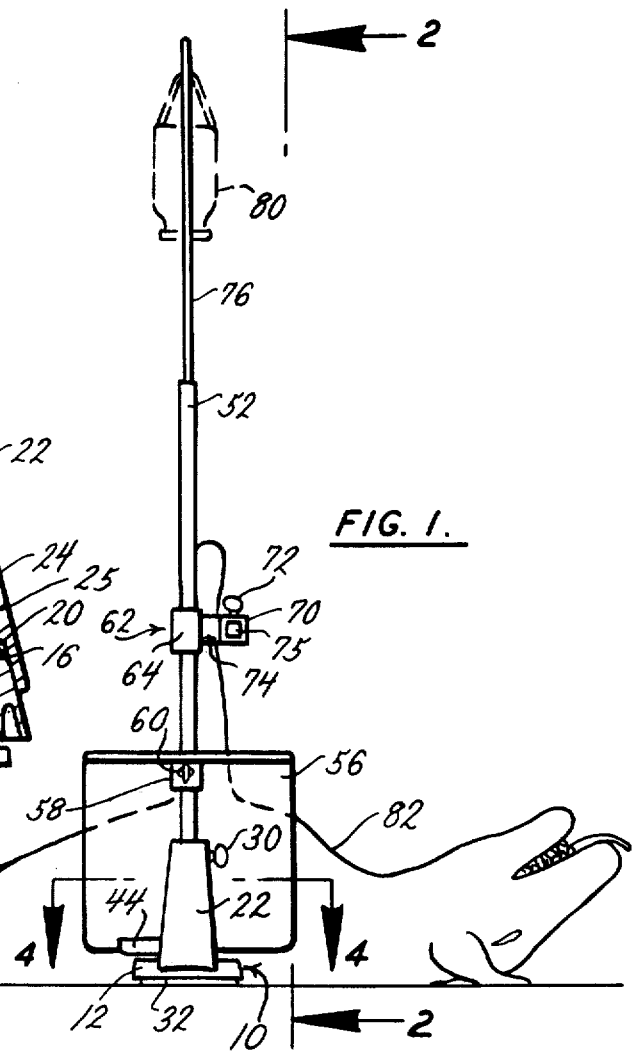
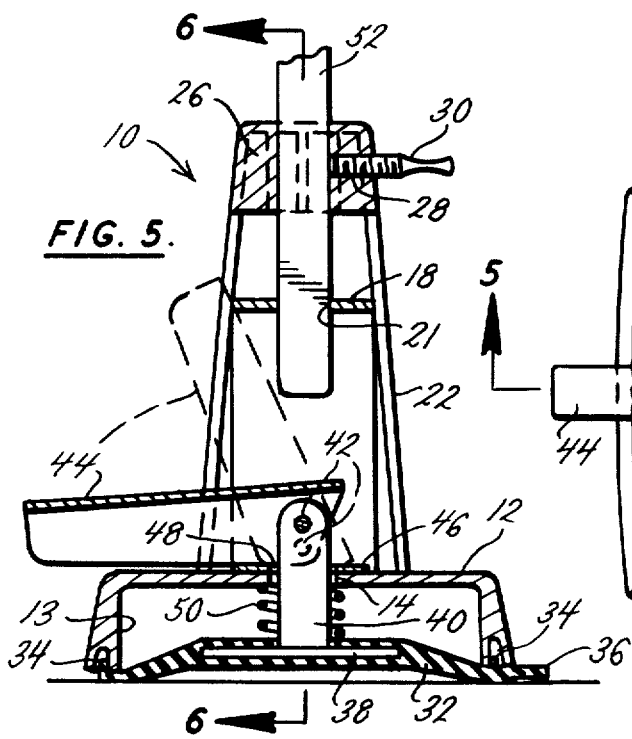
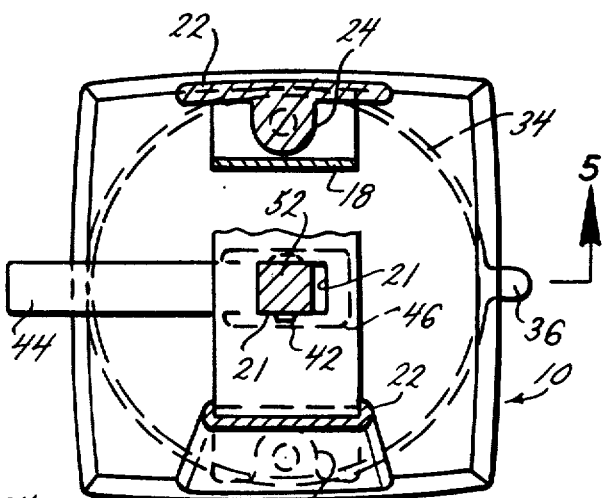

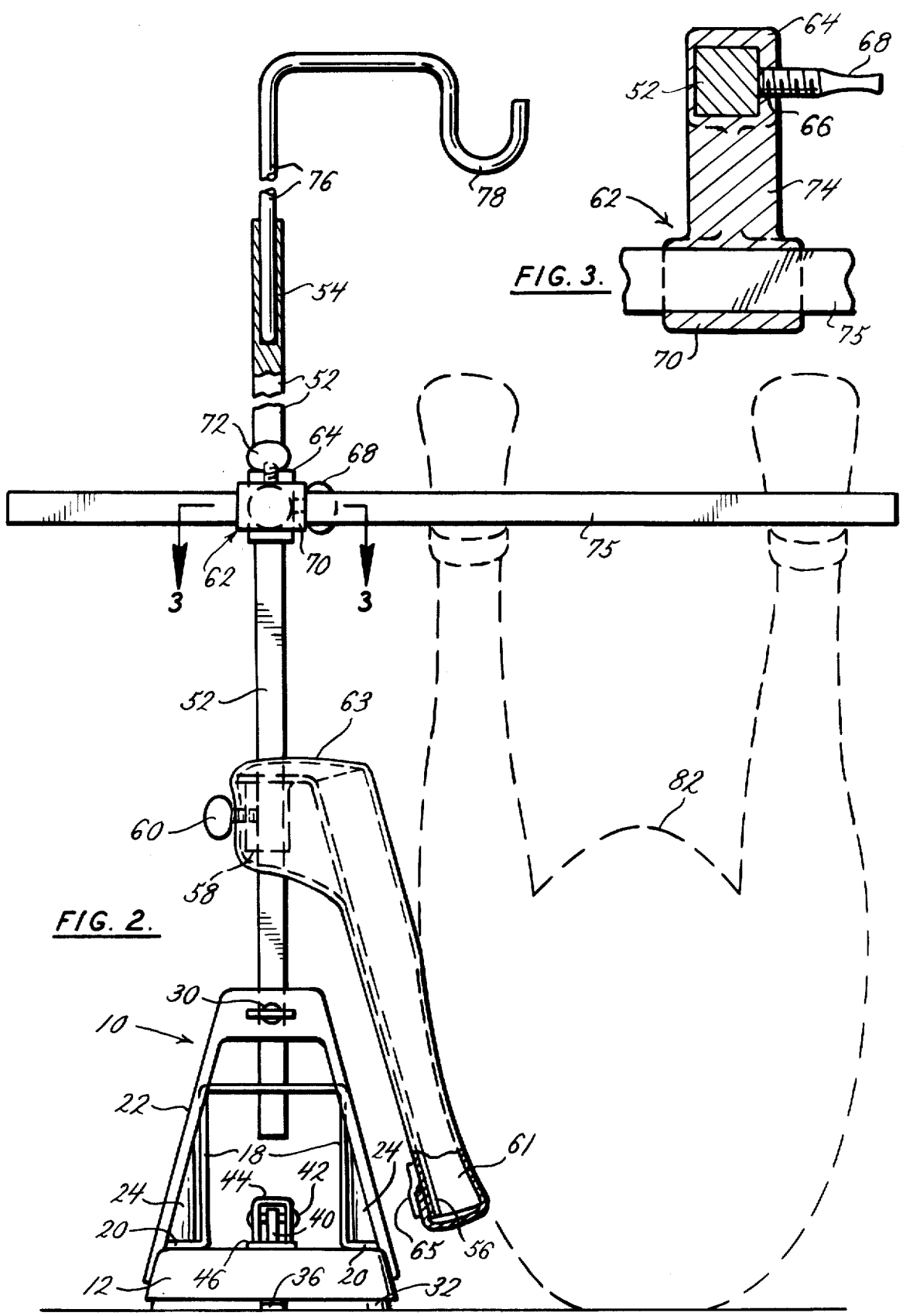

ADJUSTABLE SUPPORT

This invention relates to improvements in Adjustable Supports. More particularly, this invention relates to improvements in adjustable supports which can be used to hold a relatively-small animal on its back.

It is, therefore, an object of the present invention to provide an improved adjustable support which can be used to hold a relatively-small animal on its back.

Veterinarians, researchers, laboratory technicians, students, and the like (hereinafter referred to as users) frequently find it necessary to hold a dog, cat or other relatively-small animal on its back for purposes of examination, treatment or surgery. Unfortunately, a dog, cat or other relatively-small animal is in an unnatural and unstable position when it is on its back; and hence it is necessary to support and hold a dog, cat or other relatively-small animal when it is to be held on its back. In some instances, users have disposed one or more bags of sand or plastic granules at each side of an animals's body to provide sufficient support to the body of the animal to enable that animal to be held on its back. However, the placing of one or more bags of sand or plastic granules at each side of the body of an animal is undesirable; because those bags are essentially unyielding in nature, and they can tend to restrict the breathing of the animal. In other instances, metal loops have been clamped in position at each side of an animal; and, in still other instances, frusto V-shaped supports of wood or plastic have been used to accommodate the back and parts of the sides of the animal. In both instances, the supports are essentially unyielding in nature, and they can tend to restrict expansion of the thoracic cage of the animal during breathing and thereby impair said breathing. Some operating tables for dogs, cats and other small animals are formed to have frusto V-shaped recesses therein which accommodate the back and parts of the side of an animal; but the sides of those recesses are essentially unyielding in nature, and they can tend to restrict the breathing of the animal. It would be desirable to provide a support for a dog, cat or other relatively small animal which could hold that animal on its back and yet would not restrict the breathing of that animal. The present invention provides such a support; and that support has a padded plate-like supporting member which can be disposed adjacent part of one side of an animal to provide yielding lateral support for that side of that animal. The opposite side of the animal will be free to move as the animal breathes, and hence the support of the present invention does not restrict the breathing of the animal. It is, therefore, an object of the present invention to provide a support, which can hold a dog, cat or other relatively-small animal on its back, and which has a padded plate-like supporting member that can be disposed adjacent part of one side of that animal to provide yielding lateral support for that side of that animal.

The support provided by the present invention has a bar which is horizontally directed and to which the upwardly-extending legs of the animal can be taped or otherwise secured. That bar is located above the level of the padded plate-like supporting member; and it co-acts with that padded plate-like supporting member to affectively immobilize the animal. It is, therefore, an object of the present invention to provide a support which has a bar that is horizontally directed and to which the upwardly-extending legs of an animal can be taped or otherwise secured.

It frequently is desirable, during treatment or surgery, to infuse liquids into the veins of dogs, cats or other relatively-small animals that are held on their backs. Such infusion is difficult when the front legs of the dog, cat or other relatively-small animal are tied, taped or otherwise held in essentially horizontal positions adjacent the table on which that animal is held on its back. By use of the support of the present invention, the legs of the dog, cat or other relatively-small animal can be held in generally-vertical positions; and hence it is easy to infuse liquids into the veins within those legs. Moreover, when the legs of the dog, cat, or other relatively-small animal are held in generally-vertical positions, there tends to be less strain on the muscles of the animal's body than there is when the animal's legs are tied, taped or otherwise held in generally-horizontal positions immediately adjacent the surface on which the animal is held on its back. As a result, the support provided by the present invention minimizes the strain on the muscles of animals and also facilitates the infusion of liquids into the veins of those animals.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

BRIEF DESCRIPTION OF THE DRAWING

In the drawing,

FIG. 1 is a side elevational view, on a reduced scale, of one preferred embodiment of adjustable support that is made in accordance with the principles and teachings of the present invention, FIG. 2 is a partially-sectional elevational view, on a larger scale, of the right-hand end of the adjustable support of FIG. 1, and it is taken along the place indicated by the line 2—2 in FIG. 1, FIG. 3 is a sectional view, on a still larger scale, through part of the adjustable support of FIG. 1, and it is taken along the plane indicated by the line 3—3 in FIG. 2, FIG. 4 is a sectional view, on a scale intermediate those of FIGS. 2 and 3, through the adjustable support of FIG. 1, and it is taken along a broken plane which has the lower limit thereof indicated by the line 4—4 in FIG. 1, FIG. 5 is a sectional view, on the scale of FIG. 4, through the lower portion of the adjustable support of FIG. 1, and it is taken along the plane indicated by the line 5—5 in FIG. 4, and FIG. 6 is a sectional view, on the scale of FIG. 4, through the portion of the adjustable support of FIG. 1 that is shown in FIG. 5, and it is taken along the plane indicated by the line 6—6 in FIG. 5.

DESCRIPTION OF THE PREFERRED EMBODIMENT

Referring to the drawing in detail, the numeral 10 generally denotes the base for one preferred embodiment of adjustable support that is made in accordance with the principles and teachings of the present invention. That base includes an inverted, cup-shaped member 12 which has a cylindrical inner wall 13, as shown by FIGS. 5 and 6, and which has a skirt that extends outwardly beyond the outer periphery of that cylindrical inner wall. That skirt is defined by four, orthogonal, slightly-convex, downwardly and outwardly inclined surfaces. A slot-like opening 14 is provided in the upper surface of the inverted cup-shaped member 12; and that opening is adjacent the geometric center of that inverted cup-shaped member. Circular openings 16 are provided in the upper surface of the inverted cup-shaped member 12 adjacent the periphery of that inverted cup-shaped member, as shown particularly by FIG. 6.

The numeral 18 denotes an inverted, U-shaped guiding member of steel or other sturdy material; and that inverted U-shaped guiding member has outwardly-directed feet 20 with openings 19 therein. Those openings are disposed in register with the openings 16 in the upper surface of the inverted cup-shaped member 12. A square opening 21 is provided in the closed end of the inverted U-shaped guiding member 18; and that opening is generally in register with the slot-shaped opening 14 in the upper surface of the inverted cup-shaped member 12.

The numeral 22 denotes a frusto-triangular member with vertically-directed, generally semi-cylindrical bosses 24 at the inner surfaces of the legs thereof. Those bosses have threaded sockets 25 in the lower faces thereof; and those sockets are in register with the aligned openings 16 and 19, respectively, in the upper surface of the cup-shaped member 12 and in the feet 20 of the inverted U-shaped guiding member 18. Screws 27 have the threaded shanks thereof extending upwardly through the aligned openings 16 and 19 to seat within the threaded sockets 25 in the generally semi-cylindrical bosses 24 at the inner surfaces of the legs of the frusto-triangular member 22. Those screws solidly secure that frusto-triangular member and the inverted U-shaped guiding member 18 to the inverted cup-shaped member 12. As indicated particularly by FIGS. 1, 2, and 6, the lower ends of the legs of the frusto-triangular member 22 extend downwardly short distances below the bottoms of the generally cylindrical bosses 24 at the inner surfaces of the legs of that frusto-triangular member, and thus extend short distances downwardly below the upper surface of the inverted cup-shaped member 12.

The frusto-triangular member 22 has a sleeve-like guide 26 in the closed upper end thereof; and that sleeve-like guide defines a passage which is square in cross section and which has a vertically-directed axis. That passage is in register with the opening 21 in the closed end of the inverted U-shaped guiding member 18, as indicated particularly by FIGS. 5 and 6. A horizontally-directed threaded opening 28 is provided in the closed upper end of the frusto-triangular member 22; and that threaded opening extends from the exterior of that frusto-triangular member to the interior of the sleeve-like guide 26. That threaded opening accommodates the shank of a wing-type set screw 30.

The numeral 32 denotes a suction cup which is circular in plan view and which has an upstanding peripheral rib 34. As indicated particularly by FIG. 5, that upstanding peripheral rib has an inner diameter which is slightly larger than the outer diameter of the cylindrical inner wall 13 of the inverted cup-shaped member 12. As a result, that upstanding peripheral rib is able to move upwardly into the annular space between that cylindrical inner wall and the skirt of that inverted cup-shaped member. A tab 36 extends outwardly from one part of the perimeter of the suction cup 32; and, as shown particularly by FIG. 4, that tab extends sufficiently far outwardly of the skirt of the inverted cup-shaped member 12 to be capable of being grasped by the fingers of a user of the adjustable support of the present invention. That tab can be grasped and lifted to permit air to move under the suction cup 32, and thereby "break the vacuum" established by that suction cup.

The numeral 38 denotes a circular plate which is embedded within the central portion of the suction cup 32, as indicated particularly by FIG. 5. The diameter of that circular plate is small enough to permit the radially-outer portions of that suction cup to be flexible. As indicated particularly by FIG. 5, those radially-outer portions of that suction cup incline downwardly and outwardly at a shallow angle from the central portion of that suction cup. The numeral 40 denotes a stem which extends upwardly from the center of the circular plate 38 and from the upper surface of the suction cup 32. That stem is rectangular in cross section, and it extends upwardly through the slot-like opening 14 in the upper surface of the inverted U-shaped member 12, as indicated particularly by FIGS. 5 and 6. The cross-sectional dimensions of the stem 40 are sufficiently smaller than the dimensions of the slot-like opening 14 to permit that stem to move vertically relative to that opening without binding or jamming.

A pin 42 extends through an opening in the upper end of the stem 40 to pivotally connect that stem to a lever 44 of U-shaped cross section. The axis of that lever is parallel to the axis of the slot-like opening 14 in the upper surface of the inverted cup-shaped member 12; and the free end of that lever extends outwardly and to the left of the frusto-triangular member 22, as shown particularly by FIGS. 1, 4 and 5. The pivoted end of that lever is cam-like in configuration; and that end is intended to bear against a bearing plate 46 which overlies the center of the upper surface of the inverted cup-like shaped member 12 and which has a slot-like opening 48 therein that is in register with the slot-like opening 14 in that upper surface. The bearing plate 46 is made of a wear-resistant metal, and thus is capable of withstanding the wearing forces which will be applied to it by the cam-like pivoted end of the lever 44.

The numeral 50 denotes a helical compression spring which surrounds the lower end of the stem 40, which has the upper end thereof bearing against the underface of the upper surface of the inverted cup-shaped member 12, and which has the lower end thereof bearing against the upper face of the central portion of the suction cup 32. That spring biases that central portion downwardly toward the plane which is defined by the periphery of that suction cup, but that helical compression spring can yield to permit the lever 44 and the stem 40 to raise the central portion of that suction cup to the position shown by FIG. 5.

The inverted cup-shaped member 12, the frusto-triangular member 22, the suction cup 32, the lever 44 and the helical compression spring 50 are of standard and usual design, and they are parts of a commercially-available base. The inverted U-shaped guiding member 18 has had the feet 20 thereof interposed between the upper surface of the inverted cup-shaped member 12 and the bottom surfaces of the generally semi-cylindrical bosses 24. That inverted U-shaped guiding member coacts with the sleeve-like guide 26 of the frusto-triangular member 22 to provide full lateral stability for a vertical rod 52 which has the lower end thereof extending downwardly through that sleeve-like guide and through the opening 21 in the closed end of that inverter U-shaped guiding member. That rod has a square cross section which is complementary to the square cross section of the passage defined by the sleeve-like guide 26, and also to the square cross section of the opening 21 in the closed end of the inverted U-shaped guiding member 18. Consequently, that passage and the opening 21 and the wing-type set screw 30 can coact to effectively prevent tilting of the rod 52 relative to the base 10. The upper end of that rod has a vertically-directed socket 54 therein, as shown particularly by FIG. 2.

The numeral 56 denotes a plate-like member which has a sleeve 58 thereon that is dimensioned to telescope over, and to be adjusted vertically along the length of, the rod 52. A wing-type set screw 60 is supported by a threaded opening through that sleeve; and the inner end of that wing-type set screw can bear against the rod 52 to hold that sleeve, and hence the plate-like member 56, at any desired position along the length of that rod. The sleeve 58 underlies a narrow horizontally-directed portion of the upper end of the plate-like member 56; and the major portion of that plate-like member inclines downwardly and to the right from that horizontally-directed portion, as shown particularly by FIG. 2. The inclination of the major portion of the plate-like member 56 is parallel to the inclination of the right-hand outer surface of the frusto-triangular member 22 — so the left-hand face of that major portion can closely approach that right-hand outer surface whenever that plate-like member is in its lowemost position.

The numeral 61 denotes a pad of foam rubber or other readily yieldable material which is cemented or otherwise secured to the right-hand surface of the plate-like member 56, as that plate-like member is viewed in FIG. 2. The numeral 63 denotes a bag of flexible, liquid-impervious material which encloses the plate-like member 56, the sleeve 58, and the pad 61; and that bag can be one of the inexpensive type of bags used to accommodate sandwiches. The bag 63 is shown with its closed end overlying the horizontally-directed portion of the plate-like member 56, and with its normally-open end held closed by a length 65 of tape. When disposed in this way, the bag 63 will have two openings formed in it to accommodate the rod 52, and will have a third opening formed in it to accommodate the shank of the wing-type set screw 60. If the bag 63 were to be inverted, the normally-open end thereof could be suitably folded around the rod 42 and around the shank of the wing-type set screw 60 and then held closed by one or more lengths of tape. In either position, that bag will keep the pad 61 and the plate-like member 56 clean and free of blood.

The numeral 62 generally denotes a connector which has a passage-defining sleeve-like portion 64 adjacent one end thereof, and which has a passage-defining sleeve-like portion 70 adjacent the other end thereof. As indicated particularly by FIG. 3, the axis of the passage-defining sleeve-like portion 64 is at right angles to the axis of the passage-defining sleeve-like portion 70.

As indicated particularly by FIGS. 1 and 3, the passage-defining sleeve-like portions 64 and 70 are tubular in nature and are square in cross section. The passage-defining sleeve-like portion 64 is dimensioned so it can telescope over, and be adjustable along the length of, the rod 52. A threaded opening 66 is provided in one wall of the passage-defining sleeve-like portion 64; and that threaded opening accommodates the shank of a wing-type set screw 68. That wing-type set screw can have the inner end of the shank thereof urged into intimate engagement with the rod 52 to lock the connector 62 solidly in position relative to that rod. A threaded opening, not shown, in the passage-defining sleeve-like portion 70 of the connector 62 accommodates a wing-type set screw 72. The connector 62 has a spacing portion 74 of circular cross section, which extends between, and interconnects, the passage-defining sleeve-like portions 64 and 70. That connector can be mounted on the rod 52 so it disposes the passage-defining sleeve-like portion 70 to the right of that rod, or it can be disposed on that rod so it disposes that passage-defining sleeve-like portion to the left of that rod.

The numeral 75 denotes a bar which is dimensioned to telescope into, and to be set at different axial positions relative to, the passage-defining sleeve-like portion 70 of the connector 62. The inner end of the wing-type set screw 72 can bear against the bar 75, and can thereby solidly lock that bar against axial movement relative to that connector. When the connector 62 disposes the passage-defining sleeve-like portion 70 thereof to the right of the rod 52, as indicated by FIG. 1, the center line of the bar 75 will be displaced approximately one and three-quarters inches to the right of the center line of that rod; but, when that connector disposes that passage-defining sleeve-like portion to the left of that rod, the center line of the bar 75 will be disposed approximately 1 and ¾ inches to the left of the center line of that rod. This means that the bar 75 can be set in either of two positions wherein the center thereof will be spaced apart approximately 3 and ½ inches.

The numeral 76 denotes an elongated, inverted, L-shaped hanger which has a hook 78 adjacent the free end of the leg thereof. That hook is formed so it can support a container 80 for a liquid such as blood, glucose, or medication. The lower end of the hanger 76 is dimensioned to telescope into the elongated socket 54 in the upper end of the rod 52; and the leg of that hanger is dimensioned to displace the hook 78 to the right of that rod. That displacement is desirable; because it enables the gravitational force on the container 80 to provide a rotational moment which will develop binding forces, between the lower end of that hanger and the inner surface of the socket 54 in the rod 52, that will prevent accidental rotation of that hanger relative to that rod. Also, that displacement will enable the container 80 to be disposed at any desired position relative to the surface on which an animal 82 is supported.

In using the adjustable support that is provided by the present invention, the upper surface of the table on which the animal 82 is to be examined, treated or operated upon is cleaned; and the portion of that surface where the base 10 is to be positioned is given a light coating of water or oil. Thereafter, the suction cup 32 of that base is set in engagement with that surface so the plate-like member 56 is parallel to, and immediately adjacent, the position which will be occupied by one side of the animal 82. Thereupon, a moderate downwardly-directed force is applied to the base 10 to hold it against skidding relative to the upper surface of the table; and then the lever 44, which initially is in the upwardly-inclined position indicated by dotted lines in FIGS. 5 and 6, is rotated downwardly to the position indicated by solid lines in FIGS. 1 and 4–6. As that lever is rotated downwardly, it will act through the pin 42 to raise the stem 40 and the plate 38, and will thereby raise the central portion of the suction cup 32. As that central portion is raised, a reduced pressure will develop between that suction cup and the upper surface of the table; and the ambient atmospheric pressure will force that suction cup against that upper surface so intimately as to prevent accidental shifting or movement of the base 10 to that table.

The wing-type set screw 30 will then be rotated outwardly relative to the threaded opening 28 in the closed upper end of the frusto-triangular member 22 to permit the lower end of the rod 52 to be telescoped downwardly through the sleeve-like guide 26 and downwardly through the opening 21 in the closed end of the inverted U-shaped guiding member 18. Thereafter, that wing-type set screw will be rotated inwardly to cause the inner end thereof to solidly bear against the rod 52, and thereby solidly lock that rod against any vertical, horizontal, tilting or twisting movement relative to the base 10.

The bag 63 will be used to enclose the plate-like member 56, the sleeve 58, and the pad 61; and then the wing-type screw 60 will be rotated relative to that sleeve 56 to enable that sleeve and that plate-like member to be telescoped downwardly over the upper end of the rod 52. If the bag 63 is to be used in the inverted position shown by FIG. 2, the wing-type set screw 60 should be separated from the sleeve 58 and then used to form the opening in that bag which accommodates the shank of that set screw. Also, the upper end of the rod 52 should be used to form the openings in the bag 63 which are intended to accommodate that rod.

As indicated by FIG. 2, the plate-like member 56 will be disposed so the major portion thereof is generally parallel to the outer surface of the right-hand side of the frusto-triangular member 22. That plate-like member will be set so the lower edge thereof is immediately adjacent the surface of the table if a small dog, cat or other relatively-small animal is to be placed on the table; but that plate-like member will have the lower edge thereof displaced above that surface if a moderately-sized or large-sized dog is to be placed on that table. In FIG. 2, the plate-like member 56 occupies a position wherein the lower edge thereof is displaced above the surface, on which the animal 82 is to be placed, a distance that is about equal to the distance between the pin 42 and that surface; but that plate-like member can be set above or below that position as desired. Once the plate-like member 56 has been set in the desired position, relative to the surface on which the animal 82 is to be placed, the wing-type set screw 60 will be tightened against the rod 52 to solidly lock that plate-like member against shifting relative to that rod.

At this time, the wing-type set screw 68 will be rotated outwardly relative to the threaded opening 66 in the passage-defining sleeve-like portion 64 of the connector 62 to enable that passage-defining sleeve-like portion to be telescoped downwardly over the upper end of the rod 52. If the animal 82 is a small-sized dog, cat or other relatively-small animal, the connector 62 will usually be set so the passage-defining sleeve-like portion 70 thereof is disposed to the left of the rod 52 rather than to the right of that rod as indicated by FIG. 1. By disposing the passage-defining sleeve-like portion 70 to the left of the rod 52, the connector 62 enables a higher percentage of the lower body of that animal to be disposed to the left of the left-hand edge of the plate-like member 56. As a result, the user can have more freedom of movement in examining, treating or operating upon the lower body of the animal. On the other hand, if the animal 82 is a moderately-sized or large-sized dog, the connector 62 will usually be set so the passage-defining sleeve-like portion 70 thereof is disposed to the right of the rod 52 as shown in FIG. 1. By disposing that passage-defining sleeve-like portion to the right of that rod, the present invention enables the deep portion of the animal's chest to be generally in register with the plate-like member 56, and to thereby receive support from that plate-like member. Because of the moderate or large size of the dog, enough of the lower body of the dog will be disposed to the left of the left-hand edge of the plate-like member 56 to give the user ample freedom of movement as he examines, treats or operates on that dog.

The connector 62 will initially be set at a level which the user estimates will be close to the levels that the front paws of the animal 82 will occupy when the front legs of that animal are raised to the generally-vertical positions indicated by FIG. 1. Thereafter, the wing-type set screw 68 will be tightened to solidly lock the connector 62 against movement relative to the rod 52. At this time, the wing-type set screw 72 will be loosened to permit the bar 75 to be telescoped into the passage-defining sleeve-like portion 70 of the connector 62; and that bar will then be set so the right-hand end thereof is disposed far enough to the right of the rod 52 to enable both of the front feet of the animal 82 to be raised upwardly against that bar. Only a short portion of the length of the bar 75 should extend beyond the right-hand front leg of the animal 82 — so that right-hand end will not interfere with the activities of the user during the examining, treating or operating on that animal. If a fluid is to be infused into the animal 82, the hanger 76 will have the lower end thereof telescoped downwardly into the socket 54 in the upper end of the rod 52.

It will be noted that the adjustable support which is provided by the present invention is directly securable to the table on which the animal 82 will be examined, treated or operated upon; and it should also be noted that the said support combined the functions of helping support the animal 82 and of supporting the container 80. This is very desirable; because it avoids the cluttering of the examination, treatment and operating area which, unfortunately, accompanies the use of some prior supporting equipment for containers.

At this time the animal 82 will be placed on the table so it is resting on its back, and so its front legs can be raised upwardly and tied, taped or otherwise secured to the bar 75. One side of the shoulder area of that animal will be set immediately adjacent the bag-enclosed pad 61 and plate-like member 56, as indicated particularly by FIG. 2; and then the user will raise the front legs of the animal upwardly and tie, tape or otherwise secure them to the bar 75. The rear legs will be tied, taped or otherwise secured to hooks that are provided at appropriate places on the table for that purpose. If it is desirable to apply lifting forces to the front feet of the animal 82, the wing-type set screw 68 can be loosened, the connector 62 can be moved a short distance upwardly to apply such lifting forces, and then that wing-type set screw can again be tightened against the rod 52. The animal then will be held immobile and will be given yieldable lateral support by the adjustable support of the present invention — and yet the thoracic cage of that animal will be free of restriction. Consequently, the respiration of the animal 82 will not be adversely affected by that adjustable support.

In holding the front legs of the animal 82 in generally-vertical positions, the adjustable support of the present invention facilitates the infusion of anesthetics, blood, glucose, or medication into the veins of that animal; because the user is given virtually unrestricted and full access to the front, side and rear areas of those legs. Furthermore, if either of those front legs needs to be examined, treated or operated sleeve-like full access is provided to the front, side and rear areas of that leg for that purpose.

In FIG. 1, the front legs of the animal 82 are disposed to the left of the bar 75. With large dogs, however, those front legs will usually be disposed to the right of that bar —so even more of the portion of the body immediately behind the shoulders can receive lateral support from the plate-like member 56. Where the connector 62 is set so the passage-defining sleeve-like portion 70 is disposed to the left of the rod 52, the front legs of the animal 82 can be disposed forwardly or rearwardly of the rod 75. With a very small dog, cat or other relatively-small animal, those front legs will usually be secured to the rear face of the bar 75 to dispose as much as possible of the thoracic cage of the animal to the left of the left-hand edge of the plate-like member 56, and to dispose the abdominal area of that animal as far as possible to the left of that left-hand edge. However, a moderately-small dog, cat or relatively-small animal will usually have the front legs thereof secured to the front face of the bar 75 when that bar is disposed to the left of the rof 52 — to enable more of the portion of the animal's body rearwardly of the front legs to receive yielding lateral support from the plate-like member 56. By making it possible for the bar 75 to be set forwardly or rearwardly of the rod 52, and by making it possible to secure the front legs of the animal to the forward or rear faces of that bar in either of its two positions, the adjustable support of the present invention provides four separate and distinct positions in which the front legs of the animal can be held. As a result, the user is easily able to position the animal so he can have maximum freedom of movement in examining, treating or operating upon any desired part of the animal's body. It should also be noted that the adjustable support of the present invention is usable with dogs, cats and relatively-small animals of all sizes. For example, the said adjustable support has been used on puppy-sized dogs and cats, on full-sized St. Bernards and Great Danes, and on dogs of different sizes between puppy size and full size.

Although the plate-like member 56 is intended to, and does, provide yielding lateral support for one side of the body of the animal 82, that plate-like member does not prohibit shifting of that animal forwardly or rearwardly relative to the rod 52, and it does not prohibit shifting of that animal laterally away from the base 10. This is desirable, because it enables the user to shift the body of the animal short distances whenever it is desirable to do so during examination, treatment or operation procedures.

The inclination of the plate-like member 56 makes it possible to set an animal 82 in position so its front paws are closer to the rod 52 than are its shoulders. If, for any reason it became desirable to tilt the body of an animal 82 away from the plate-like member 56, the bar 75 could be shifted further to the right in FIG. 2 until the animal's front paws were further from the rod 52 than were the shoulders of that animal. In such event, the lower edge of the plate-like member 56 would continue to provide lateral support for the animal, but the body of the animal would tilt away from, rather than toward, the upper portion of that plate-like member. In these various ways, the adjustable support of the present invention is able to immobilize the position of an animal on its back, and yet offers the user a full opportunity to shift and tilt the body of that animal as desired.

At the conclusion of the examination, treatment or operation on the animal 82, the front legs of that animal will be freed from the bar 75, the lever 44 will be returned to the upper position shown by dotted lines in FIGS. 5 and 6, and the tab 36 will be raised upwardly to permit air to break the vacuum beneath the suction cup 32. Thereafter, the base 10 can be separated from the table for cleaning and disinfecting. All parts of the adjustable support can be exposed to cleaning and disinfecting procedures and solutions; and hence those parts are readily rendered clean and disinfected. Moreover, those parts can be separated and stored, until again needed, within a very small space.

Whereas the drawing and accompanying description have shown and described a preferred embodiment of the present invention, it should be apparent to those skilled in the art that various changes may be made in the form of the invention without affecting the scope thereof.

What I claim is:

1. A support that is releasably securable to a table regardless of the thickness of the top of said table, said top of said table having an upper surface on which an animal is to be held and supported while said animal is insensible and is resting on its back, said support being releasably securable to said table regardless of the cross sections of the edges of said top of said table and comprising a base which has all portions thereof disposed atop said upper surface of said top of said table, said base being releasably securable to any desired area of said upper surface of said top of said table, including areas which are located substantial distances inwardly of the closest edge of said top of said table, whereby said base can be releasably secured to whatever area of said upper surface of said top of said table is optimum for free and full access to desired portions of the anatomy of said animal, an upright which is supported by and which extends upwardly from said base, and a means which receives its support from said upright but which extends laterally outwardly from said upright and which is spaced above the level of said base to releasably hold the upwardly-extending legs of said animal while said animal is insensible and is resting on its back atop said upper surface of said top of said table.

2. A support as claimed in claim 1 wherein said base includes a suction cup which can firmly but releasably secure said base to any flat area on said upper surface of said top of said table, and wherein said means is disposable at various points along the length of said upright to vary the distance between said means and said upper surface of said top of said table, and thereby enable said means to releasably hold the upwardly-extending legs of animals of different sizes.

3. A support as claimed in claim 1 wherein said base is releasably securable to any flat area on said upper surface of said top of said table which is located at that side of said animal which is remote from the veterinarian who is treating said animal, and wherein said means is disposable in various positions laterally of said upright, and hence to horizontally relative to said veterinarian, to enable said means to releasably hold the upwardly-extending legs of animals of different body widths and yet not have that end of said means which confronts said veterinarian obstruct the working area adjacent said animals which is required by said veterinarian.

4. A support as claimed in claim 1 wherein said base extends laterally outwardly beyond said upright in all directions to resist tilting of said upright in any direction relative to said upper surface of said top of said table, and wherein said means is disposable at various points along the length of said upright to vary the distance between said means and said upper surface of said top of said table, and wherein said means is disposable in various positions laterally of said upright, whereby said means can releasably hold the upwardly-extending legs of animals of different sizes and of different body widths.

5. A support that is releasably securable to a table regardless of the thickness of the top of said table, said top of said table having an upper surface on which an animal is to be held and supported while said animal is insensitive and is resting on its back, said support being releasably securable to said table regardless of the cross sections of the edges of said top of said table and comprising a base which is releasably securable to said table, an upright which is supported by and which extends upwardly from said base, a means which receives its support from said upright but which extends laterally outwardly from said upright and which is spaced above the level of said base to releasably hold the upwardly-extending legs of said animal while said animal is resting on its back atop said upper surface of said top of said table, a connector which has a portion thereof that encircles a desired portion of the length of said upright and that permits the upper part of said upright to project upwardly above it, said connector having a further portion that encircles a desired portion of the length of said means and that permits one end of said means to project outwardly beyond it, said further portion of said connector being displaced horizontally from the first said portion of said connector, said connector releasably holding said means in assembled relation with said upright, and said connector selectively disposing said desired portion of said length of said means forwardly of said portion of said length of said upright or rearwardly of said portion of said length of said upright, and thereby effecting shifting of the body of said animal forwardly and rearwardly relative to said base.

6. A support as claimed in claim 1 wherein said base has a guide adjacent the upper end thereof which accommodates and provides lateral support for one portion of the lower end of said upright, wherein said base has a second guide which is in register with but is displaced an appreciable distance below the first said guide, wherein said second guide accommodates and provides lateral support for a lower portion of said lower end of said upright, whereby said base can provide solid lateral and anti-tilting support for said upright relative to said upper surface of said top of said table.

7. A support that is securable to a table regardless of the thickness of the top of said table, said top of said table having an upper surface on which an animal is to be held and supported while said animal is insensible and is resting on its back, said support being securable to said table regardless of the cross sections of the edges of said top of said table and comprising a base which is securable to said table with all portions thereof disposed atop said top of said table, an upright which is supported by and which extends upwardly from said base, and a plate-like surface which is displaced laterally outwardly from one side of said upright to receive and to provide lateral support for a portion of one side of said animal, said plate-like surface being inclined to the vertical but being closer to the vertical than it is to the horizontal, said plate-like surface being coextensive with a portion of one side of said upright and extending longitudinally beyond both the front and rear of said upright.

8. A support as claimed in claim 7 wherein said plate-like surface is in addition to but is coextensive, at least in part, with said base, and wherein a portion of said plate-like surface projects laterally outwardly in at least one direction beyond said base.

9. A support as claimed in claim 7 wherein said plate-like surface has a portion which encircles said upright and has a further portion which is inclined downwardly and outwardly from said upright, and wherein said further portion of said plate-like surface has the lower edge thereof displaced laterally outwardly of the adjacent side of said base.

10. A support as claimed in claim 7 wherein said plate-like surface is disposable at various points along the length of said upright to vary the distance between the lower edge of said plate-like surface and said upper surface of said top of said table and thereby provide lateral support for said one side of animals of different sizes, and wherein said plate-like surface has at least a portion thereof coextensive with a portion of said upright at each point at which said plate-like surface is disposed along said length of said upright.

11. A support as claimed in claim 1 wherein said upright has an axially-directed socket in the upper end thereof, and wherein a hanger for liquids has the lower end thereof dimensioned to fit into and be releasably held by said socket, whereby said upright can simultaneously perform the dual functions of providing support for said means and of providing support for said hanger for liquids.

12. A support that is usable to hold an animal on its back and that comprises a base, which is positionable on a table on which an animal is to be held and supported while resting on its back, an upright secured to and extending upwardly and receiving its support from said base, a supporting member adapted to receive and to provide lateral support for one side of the body of said animal, means adjustably securing said supporting member to said upright to enable said supporting member to receive its support from said upright and to be set at different positions along the length of said upright and thereby provide lateral support for large, intermediate, and small animals, said supporting member being coextensive with a portion of one side of said upright and extending longitudinally beyond either the front or rear of said upright, a leg-supporting element dimensioned to extend laterally beyond said one side of said upright and also laterally beyond said supporting member, and further means adjustably securing said leg-supporting element to said upright to enable said leg-supporting element to receive its support from said upright and to be set at different positions along the length of said upright and thereby accommodate the legs of large, intermediate, and small animals, said further means holding said leg-supporting member so it is disposed above the level of said supporting member, and said supporting member and said leg-supporting element simultaneously providing lateral support for one side of the body of said animal and vertical support for two of the legs of said animal.

13. A support as claimed in claim 12 wherein said further means includes a connector which offsets and displaces said leg-supporting element an appreciable distance from said upright in a direction transverse of the axis of said upright, wherein said connector can offset and displace said leg-supporting member said appreciable distance forwardly of said upright to displace said leg-supporting element forwardly relative to said supporting member, and wherein said connector can offset and displace said leg-supporting member said appreciable distance rearwardly of said upright to displace said leg-supporting element rearwardly relative to said supporting member, whereby the positions of the upwardly-extending legs of said animal, and hence the position of the body of said animal, can be shifted relative to said supporting member.

14. A support as claimed in claim 12 wherein said further means automatically offsets and displaces said leg-supporting element transversely relative to said upright in each position of said further means.

15. A support as claimed in claim 12 wherein said leg-supporting member is elongated and is held generally horizontal by said further means, wherein said further means permits said leg-supporting element to be shifted endwise and thus to be adjusted laterally of said upright to releasably hold the upwardly-extending legs of animals of different sizes.

16. A support as claimed in claim 12 wherein said supporting member is plate-like in configuration and inclines downwardly and outwardly from said upright, and wherein said supporting member is coextensive with a portion of one side of said base and extends longitudinally beyond both the front and rear of said base.

17. A support as claimed in claim 12 wherein said supporting member is interposed between said base and the body of said animal, and wherein said supporting member is, at least in part, coextensive with said base but has a longitudinal dimension greater than every longitudinal dimension of said base, whereby said supporting member extends longitudinally beyond said base in at least one direction.

18. A support as claimed in claim 7 wherein said plate-like surface has a resilient pad thereon, and wherein said resilient pad is interposable between said plate-like surface and said animal to provide yieldable lateral support for said one side of said animal.

19. A support as claimed in claim 12 wherein said supporting member has a resilient pad thereon, and wherein said resilient pad is interposable between said supporting member and said animal to provide yieldable lateral support for said one side of said animal.

* * * * *